No. 771,868. PATENTED OCT. 11, 1904.
W. H. FREEDMAN.
AUTOMATIC BRUSH ADJUSTER.
APPLICATION FILED AUG. 18, 1903.
NO MODEL. 6 SHEETS—SHEET 1.
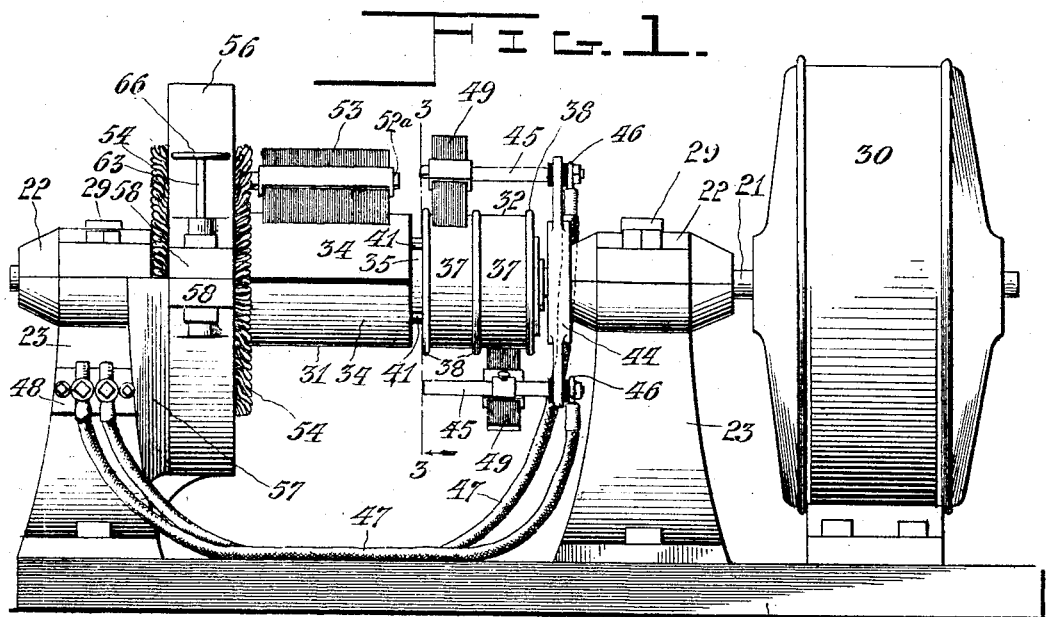
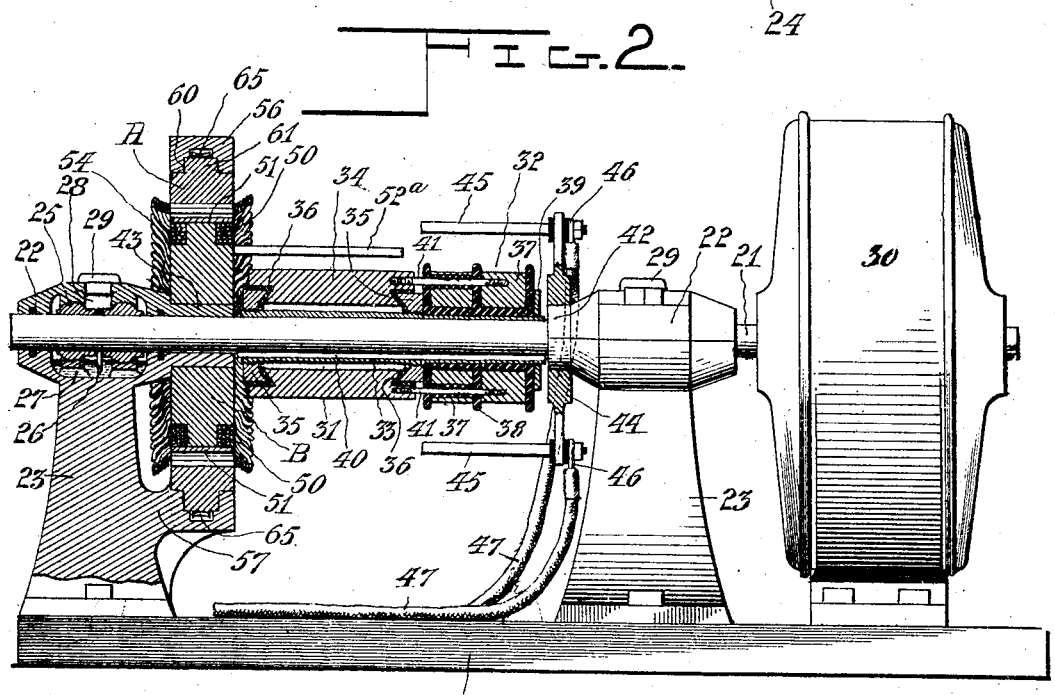
Witnesses. Inventor:
William H. Freedman
By
Edward P. Thompson
Attorney.

No. 771,868. PATENTED OCT. 11, 1904.
W. H. FREEDMAN.
AUTOMATIC BRUSH ADJUSTER.
APPLICATION FILED AUG. 18, 1903.
NO MODEL. 6 SHEETS—SHEET 2.
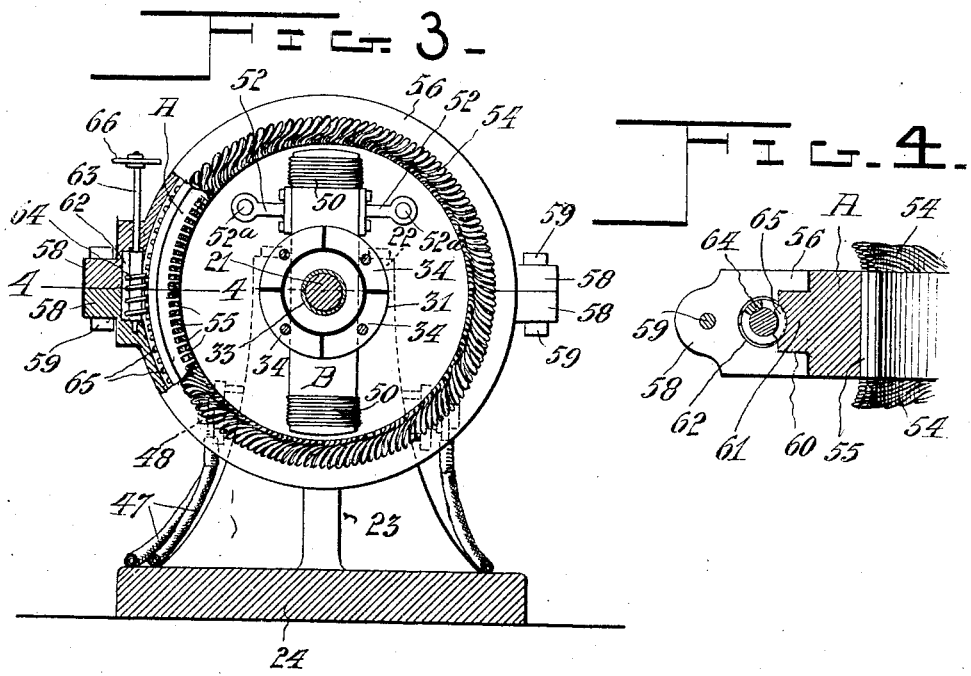
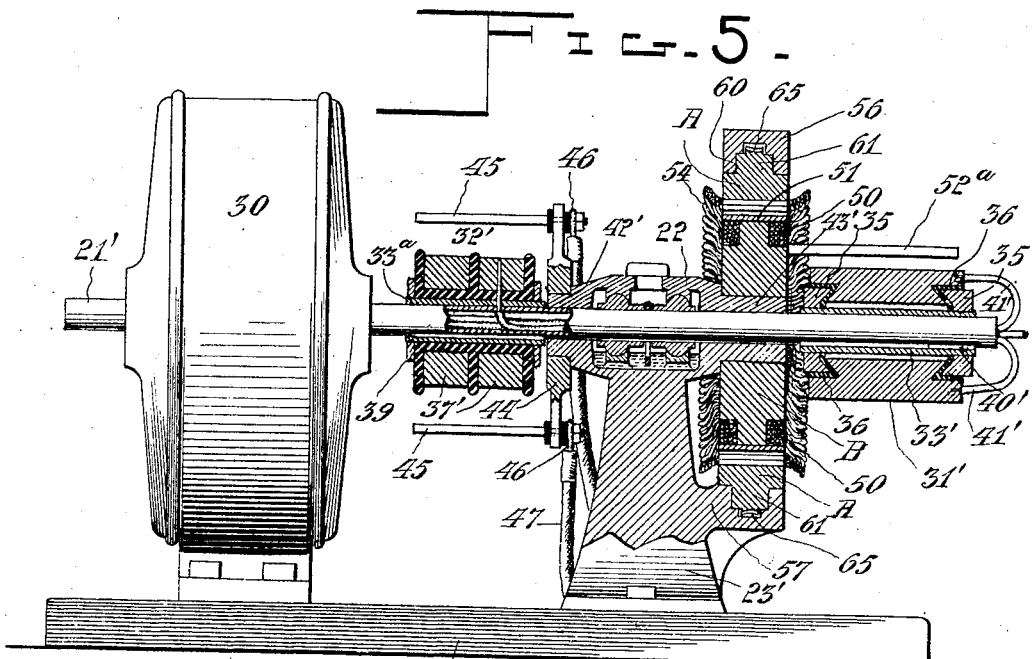
Witnesses. Inventor,
William H. Freedman
By
Edward P. Thompson
Attorney.

No. 771,868. PATENTED OCT. 11, 1904.
W. H. FREEDMAN.
AUTOMATIC BRUSH ADJUSTER.
APPLICATION FILED AUG. 18, 1903.
NO MODEL. 6 SHEETS—SHEET 3.
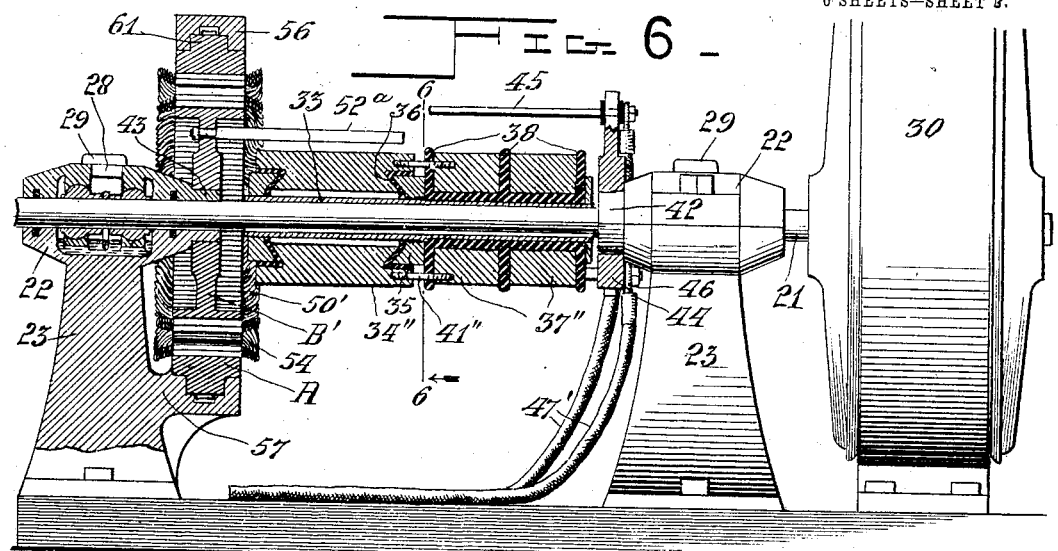
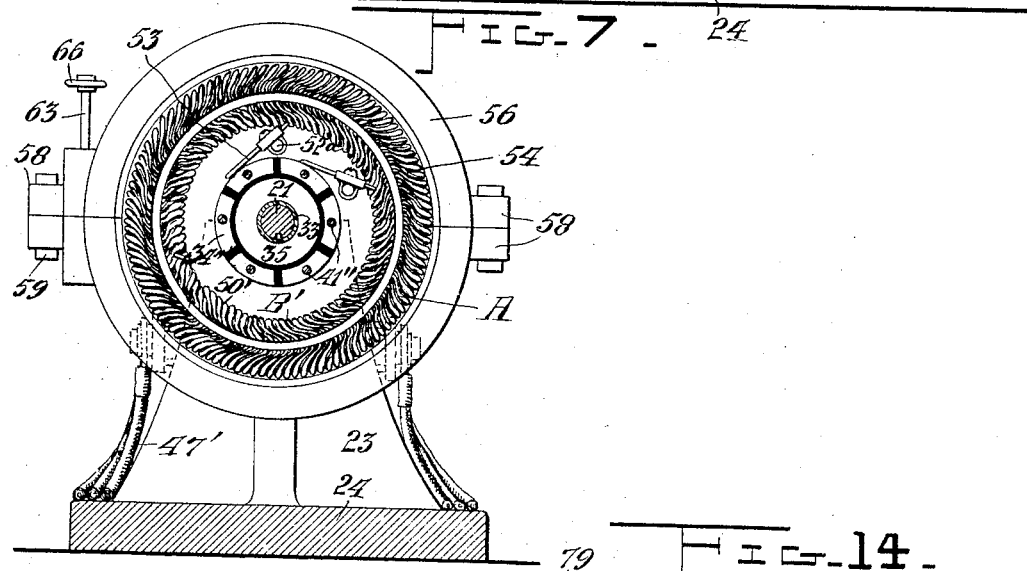
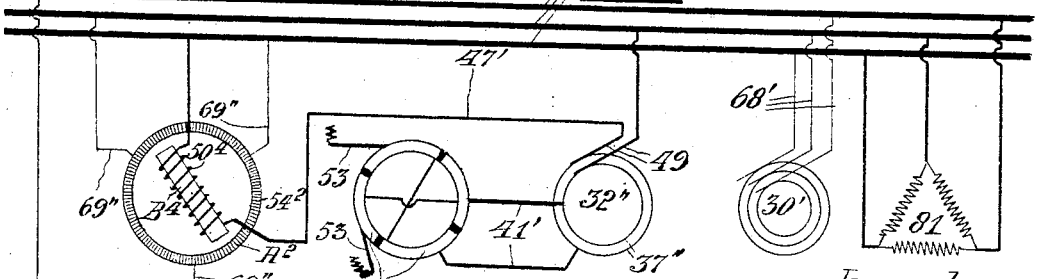
Witnesses
Inventor:
William H. Freedman
By Edward P. Thompson
Attorney.

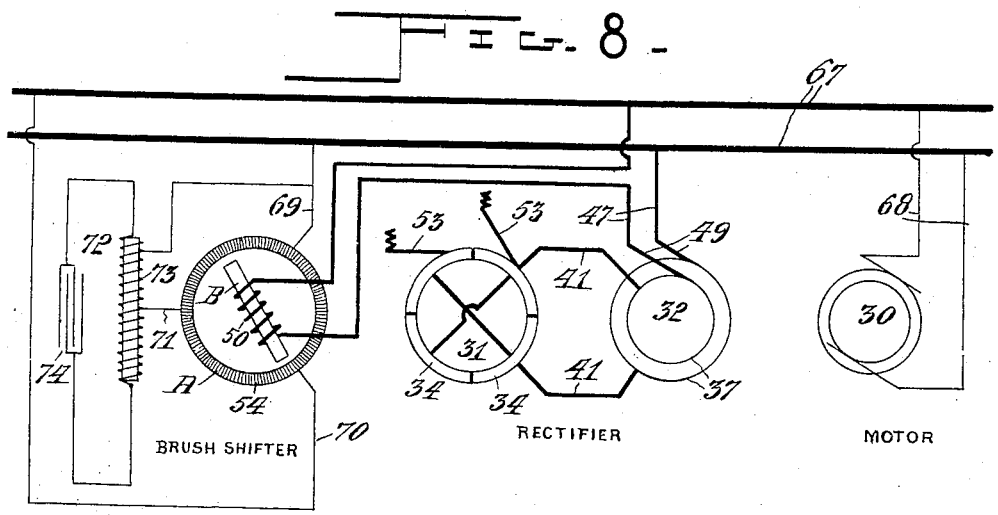
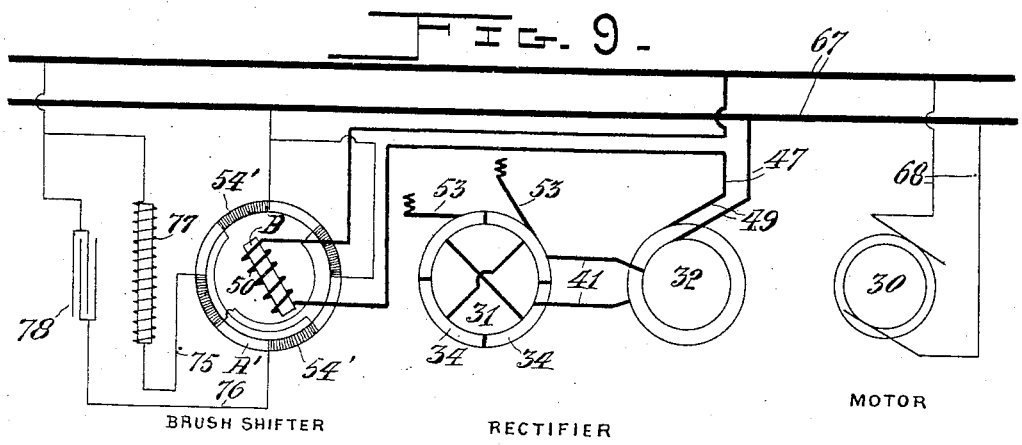
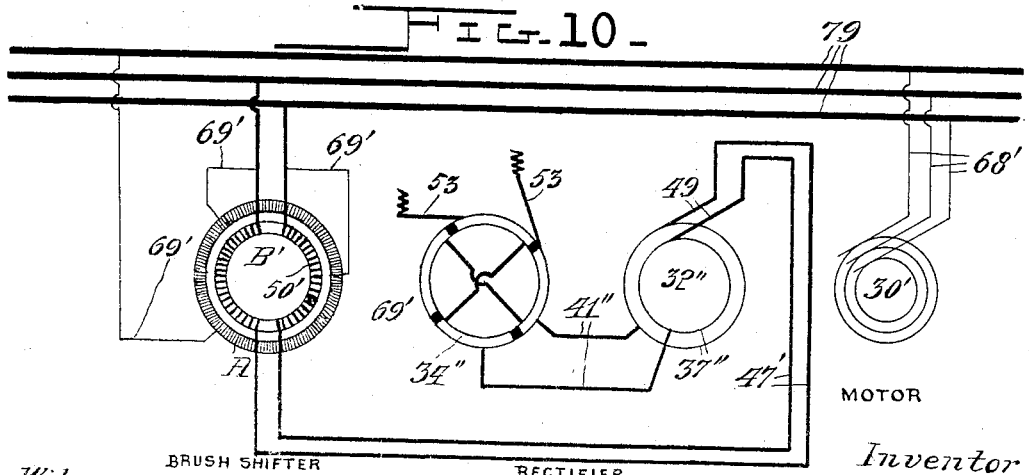

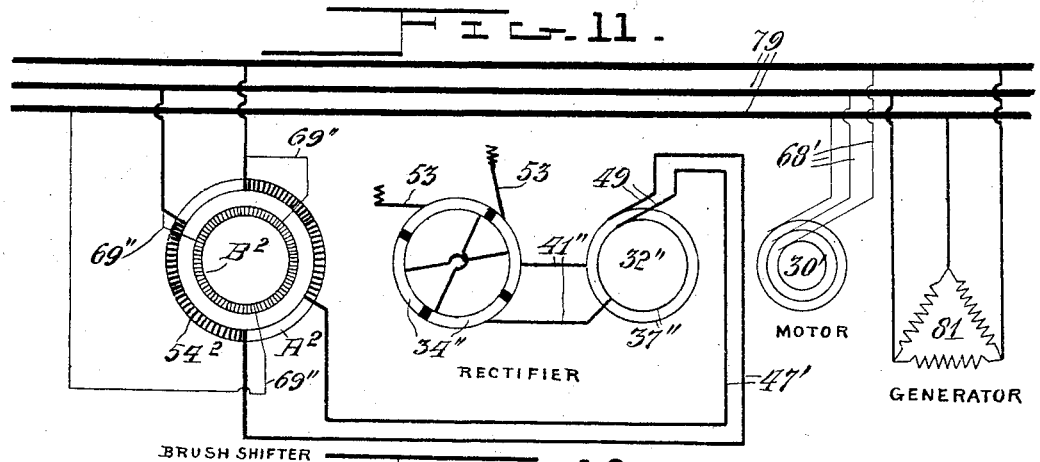
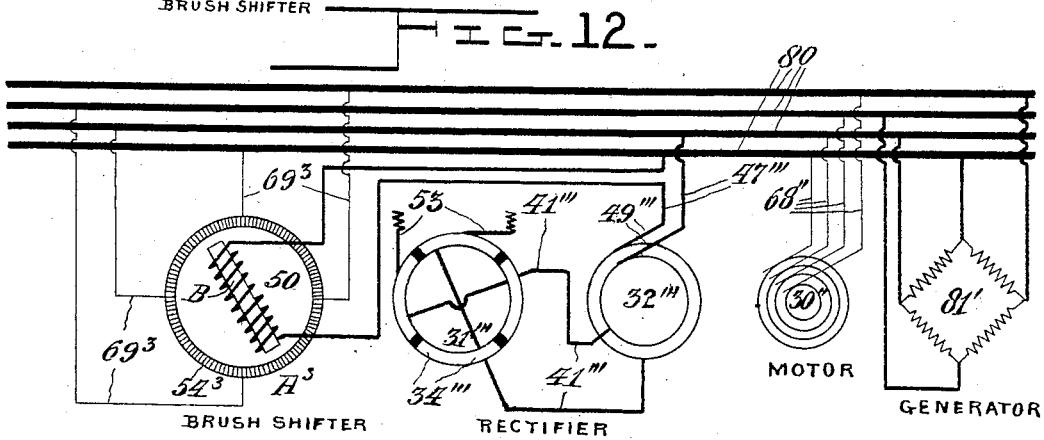
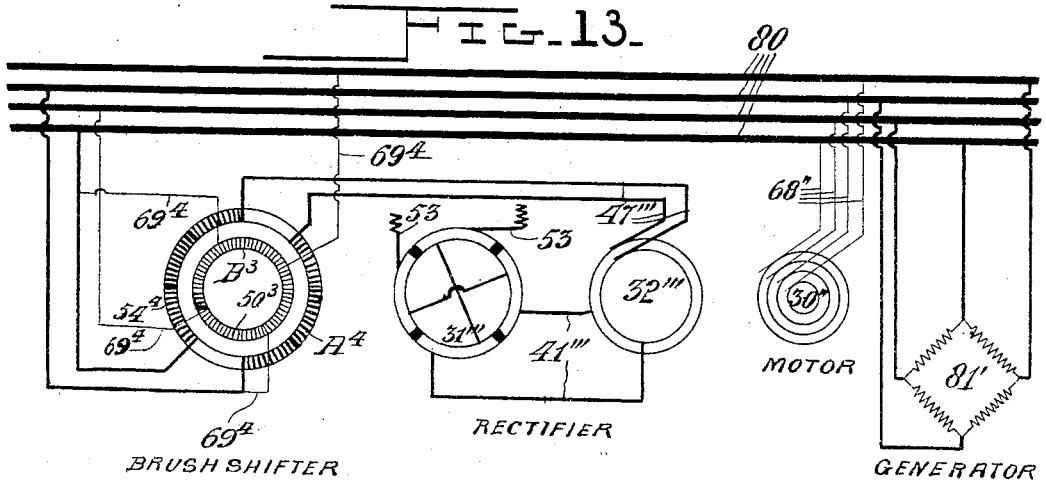

No. 771,868. PATENTED OCT. 11, 1904.
W. H. FREEDMAN.
AUTOMATIC BRUSH ADJUSTER.
APPLICATION FILED AUG. 18, 1903.
NO MODEL. 6 SHEETS—SHEET 6.
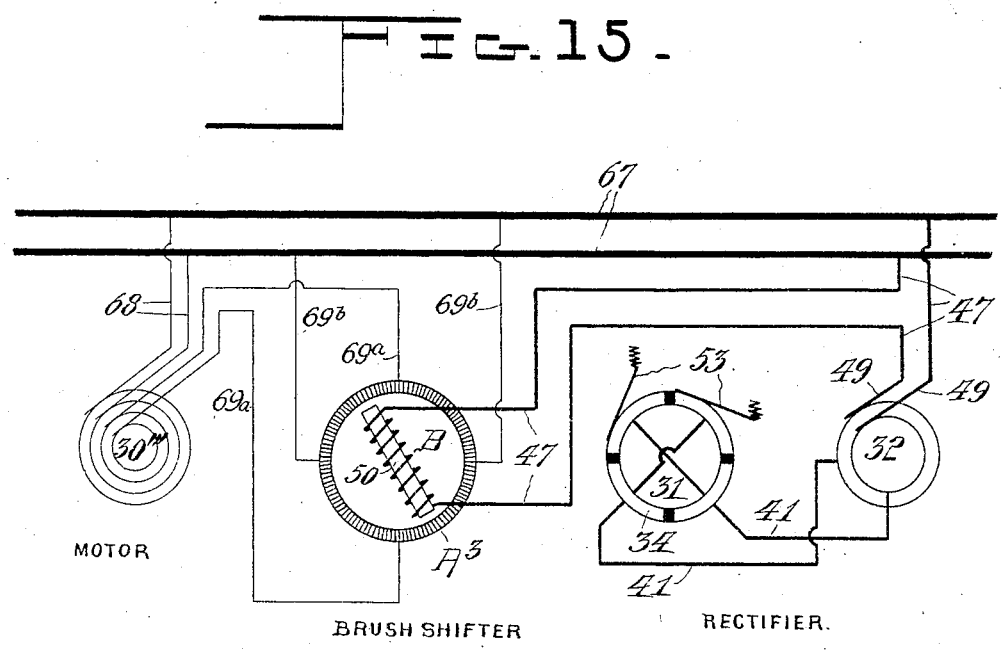
INVENTOR
William H. Freedman No. 771,868. Patented October 11, 1904.

UNITED STATES PATENT OFFICE.

WILLIAM H. FREEDMAN, OF BURLINGTON, VERMONT.

AUTOMATIC BRUSH-ADJUSTER.

SPECIFICATION forming part of Letters Patent No. 771,868, dated October 11, 1904.

Application filed August 18, 1903. Serial No. 169,856. (No model.)

*To all whom it may concern:*

Be it known that I, WILLIAM HORATIO FREEDMAN, a citizen of the United States of America, and a resident of Burlington, in the county of Chittenden and State of Vermont, have invented certain new and useful Improvements in Automatic Brush-Adjusters, of which the following is a specification.

My invention relates to automatic brush-adjusting mechanism for the commutators of dynamo-electric apparatus, but which is especially adapted for use on composite generators, rotary transformers, current-rectifiers, and like apparatus for transforming an alternating into a direct current. As is well known, the neutral or non-sparking position of the brushes on the direct-current side of all such devices is a shifting one, varying with the load or amount of current handled. This is due to the impedance constants of the circuit on the alternating-current side, which cause a phase displacement, ordinarily a lag of the current behind the impressed electromotive force, whose amount is proportional to the volume of the current itself. Consequently when the load changes the brushes on the rectifying-commutator which were originally set to the neutral position are now no longer in the neutral position, and the result is to cause violent sparking, which is destructive of the machine itself and of its efficiency. This disadvantage of sparking is one to which rectifiers are especially subject and to a large extent has prevented their extended use.

It is the object of my present invention to obviate these disadvantages by providing automatic shifting mechanism for the brushes operated by and dependent on the current undergoing rectification, such that when for any reason the phase displacement of the current varies the position of the brushes is automatically shifted through a like angle, so that the neutral position of the latter is preserved.

My invention comprises, generally speaking, a fixed element and a movable element, both mounted coaxially with the commutator and the movable element carrying the brushes to be shifted. One of these elements carries a rotary magnetic field, the other merely an alternating field, and one of said magnetic fields is energized by a shunt-circuit across the poles of the main circuit, while the energizing-coils of the other are connected in series therewith. These two fields therefore interact upon each other to cause a slight oscillation of said movable element each time the phase displacement of the current changes and through the same angle, whereby the brushes are correspondingly changed in position.

My invention comprises, more explicitly, the constructions and combinations of parts which are hereinafter described, and more particularly set forth in the claims.

In the drawings accompanying this specification I have illustrated several of the possible embodiments of my invention, and wherein—

Figure 1 is a side elevation of one form of rectifying apparatus for single-phase currents embodying my invention. Fig. 2 is a similar view of the same, showing the parts involved in my invention in diametral cross-section. Fig. 3 is a transverse sectional view of the same, taken on the line 3 3 of Fig. 1. Fig. 4 is a plan section on the line 4 4 of Fig. 3. Fig. 5 is a view similar to Fig. 3 of another form of rectifier, also single phase, with the same form of my invention applied thereto. Fig. 6 is a similar view of a rectifier embodying another form of my invention for rectifying one phase of a polyphase circuit. Fig. 7 is a transverse section of this machine, taken on the line 6 6 of Fig. 6. Fig. 8 is a diagram of connections of the single-phase rectifier shown in Figs. 1, 2, and 3. Fig. 9 is another diagram, showing an alternative mode of connection for the same machine. Figs. 10 and 11 are alternative diagrams of connections for three-phase machines similar to the machine shown in Fig. 6. Figs. 12 and 13 are diagrams showing connections for four-phase (two-phase) circuits of two different forms of my device. Fig. 14 is a diagram showing method of connecting three-phase circuits to the form of machine shown in Fig. 1. Fig. 15 shows an alternative arrangement for single-phase rectifiers, whereby split phase-currents are obviated.

The essential elements of my invention, which appear in all the forms, are a fixed magnetic element termed $A\ A'\ A^2$, &c., and a coöperating movable magnetic element B, (B' B², &c.,) which last operates to shift the brushes and is itself shifted by the electromagnetic interaction of the two elements. Both of these elements may, and one of them must, carry a rotary magnetic field, while the field of the other may be simply pulsating or alternating. Both are energized from the alternating or polyphase current circuit which is to be rectified; but one is connected in what is known as the "pressure relation"—that is, in the same manner as a voltmeter—across the poles of the circuit, being wound with high-resistance coils, while the other is connected in what is known as "current relation"—that is, in series with the main current undergoing rectification or in shunt with a fixed resistance in series in said circuit, like an ammeter. In the forms herein shown the fixed element A is formed as a ring to carry the rotary field and surrounding and inclosing the element B, which may be a ring or a bar carrying a pulsating field.

Referring now to Figs. 1 to 4, inclusive, 21 designates the main shaft, which is mounted in bearings 22, carried on standards 23, secured to the bed-plate 24. Each bearing may comprise a pair of spherical bearing-blocks 25, between which is an oil-ring 26, dipping into an oil-reservoir 27 and filled through an aperture 28, covered by a cap 29. The shaft 21 is driven by a synchronous motor 30, mounted on the same bed-plate and which should ordinarily be connected to the mains of the same circuit as the rectifier in order to drive the latter synchronously. Between the bearings 22 is mounted on the shaft the rectifying-commutator 31 and the set of slip-rings 32. The former is composed of the sleeve 33, the segments 34, and the clamping-collars 35, which screw on the sleeve 33 and hold the segments together, being electrically separated from the latter by insulating-washers 36. The set of slip-rings 32 comprises in like manner the individual rings 37, also mounted on the sleeve 33 and separated from each other and said sleeve by insulating material 38. They are clamped in position against the collar 35 by a clamping-plate 39. The sleeve 33 is keyed to the shaft 21 by a feather 40. The rings 37 are respectively connected to the commutator-segments by copper rods 41, which may be either screwed or soldered to the rings and segments. These details may be of any suitable construction, as they do not concern my invention. Each of the bearings 22 has a reduced cylindrical extension 42 and 43, on which is mounted the oscillating brush-holder carrying the brushes for the rings 32 and commutator 31, respectively. The brush-holder 44, mounted on the extension 42, carries the insulated bars 45, to which are connected the terminals 46 of the current-leads 47, which convey the current to the terminal board 48.

The bars 45 carry the brushes 49, which engage with the respective rings 37.

I have herein shown the movable member B, above referred to, as constituting a part of the brush-shifter for the commutator 31 and accordingly rotatably mounted on the bearing extension 43. It might also be mounted directly on the shaft 21; but it is thought better to mount it independently of the latter in order to avoid frictional displacement. The element B is here in the form of a bar mounted to swing about a transverse central axis and having at its ends coils or windings 50, through which passes the main current or a portion thereof, as will be explained later, and which are surmounted by pole-shoes 51. This element B in its capacity of brush-holder carries a pair of bracket-arms 52 at one end, on which are mounted the brush-rods 52ª, carrying the commutator-brushes 53, subtending an angle (here ninety degrees) at the center of the latter equal to that of a segment 34. The other or stationary element, A, is, as shown, in the form of a ring surrounding the element B and wound with coils 54 such as to produce a rotary field and which may be set in slots 55 around the inner periphery of the ring. This ring may be cast upon the frame; but it is preferred to build it up from laminated iron in the usual manner and mount it adjustably in a ring or pole yoke 56, which is itself cast on the frame and connected therewith by a semicircular web 57. The upper half of this yoke is removable and bolted to the lower half by lugs 58 and bolts 59, as shown. It has a groove 60 around its internal periphery, in which fits the tongue or flange 61 on the ring A, and at one side it is provided with a cored recess 62, in which is journaled a screw-stem 63, carrying a worm 64, which engages with the teeth 65 on the periphery of the flange 61, and the stem 63 extends upwardly through the yoke and has mounted on its upper end an operating-handle 66 for the purpose of setting the ring A to the proper neutral position of the brushes.

To understand the connection and operation of the device, refer now to Fig. 8, where 67 designates a pair of alternate-current mains or bus-bars carrying single-phase current. The several parts of the apparatus are shown diagrammatically below and designated by their proper names and numerals. The motor 30 is supplied by conductors 68 across the mains 67, and therefore should maintain the rectifier continuously in the same phase relation to the impressed electromotive force of the circuit, the load hereon being constant. The rectifier-current is supplied to the slip-rings 32 by the leads 47, in one of which are inserted the coils 50 of the element B. The coils 54 of the other element, A, are provided with a three-phase winding two of whose terminals are connected by leads 69 70 directly to the mains 67, while the third is connected to either of the terminals 67 by a lead 71, in which is interposed an autotransformer 72, comprising a choke-coil 73 and a condenser 74. The proportions of the choke-coil and condenser are so adjusted as to displace the current in the lead 71 through an angle of one hundred and twenty degrees, whereby an artificial three-phase split current is produced.

Fig. 9 shows another mode of winding and connecting the coils of the element A' by a two-phase split current, all the other features being as in Fig. 8. The coils here designated 54' of the element A' are wound in four sections, each pair of opposite coils being joined in series and to the respective mains 67 by leads 75 76, in the former of which is connected an inductance 77 and in the latter a capacity 78. The values of these elements 77 and 78 are so adjusted as to give to the current in one circuit a lag and in the other a lead, which differ from each other by ninety degrees, and thus produce a rotating magnetic field in the element A'.

In Fig. 5 is shown a modified mechanical construction for this type of device with a single bearing 22', supported on a post 23', fixed to the bed-plate 24', on which, as before, the motor 30 is mounted to turn the tubular shaft 21' of the apparatus. The commutator 31' is of the same form as previously shown, its short sleeve 33' being secured on the end of the shaft by a key 40'. Similarly the set of slip-rings 32' is provided with a sleeve $33^a$, secured to the shaft on the other side of the bearing 22'. The rings 37' are connected to the commutator-segments by insulated leads 41', which are carried at their inner ends through holes in the shaft 21' and the sleeve $33^a$, as shown, and their ends are secured to the respective rings and segments. The bearing 22' is here provided with two extensions 42' and 43', one on each side, on which are mounted, respectively, the brush-holder 44 for the slip-rings and the element B, carrying the commutator-brushes, all as in Fig. 1. The element A and its adjusting mechanism are here as already described for Fig. 1.

In Figs. 6 and 7 is shown a machine for rectifying one phase of a three-phase circuit and in which the movable element B' is made annular, like the stationary element A, and is provided with a winding 50', producing consequent poles at the opposite ends of a diameter, while the element A is three-phase wound, as in Fig. 1. There are, again, two rings 37", and the commutator is here shown as having six segments 34", the exact number being immaterial, provided it corresponds with the number of poles of the driving-motor. The respective segments are connected to the respective rings by insulated bars 41". The shaft 21 is driven by a three-phase synchronous motor 30'. In other respects this machine is constructed as in Fig. 1. Figs. 10 and 11 show the windings that may be applied to this form of machine differing in the fact that in the former the element A is connected in pressure relation and the element B' in series relation and in the latter these connections are reversed. The three-phase supply-mains or bus-bars are shown at 79 energized by a three-phase generator 81, Fig. 11. The synchronous motor 30' is operated in parallel with the mains by leads 68', and the current-leads 47' before passing to the slip-rings have inserted in series therewith the coils of the movable element B' in Fig. 10 of the fixed element $A^2$ in Fig. 11, while the fixed element A in Fig. 10 (the movable element $B^2$ in Fig. 11) is connected by leads 69' and 69" to the respective mains 79 in pressure relation thereto. It will of course be understood that, while in the diagrammatic views for the sake of simplicity the entire rectifying-current is shown as passing through the element A or B, in the case of large currents only a portion need be sent through these coils, the remainder passing through a shunt or dead resistance in parallel with said coils.

Figs. 12 and 13 show examples of connection with a four-phase or two-phase circuit represented by mains 80, energized by a four-phase generator 81'. The rectifier is in this case driven by a four-phase motor 30", connected in parallel with the rectifier by leads 68". The commutator 31''' has again as many segments as the synchronous motor has poles, (here four in number,) and the slip-rings 32''' are connected to the respective segments of the commutator by connections 41''' and through the brushes 49'''. In Fig. 12 the fixed element $A^3$ is wound with high-resistance four-phase coils $54^3$, connected across the mains 80 by leads $69^3$. The movable element B is in the form of a bar wound with a single low-resistance coil 50 in series with only one of the current-leads 47''' and brushes 49''', as in Fig. 8, the other being connected directly to the other brush. In Fig. 13 the fixed element $A^4$ is wound with two low-resistance coils $54^4$, one of which is connected in series with each of the current-leads 47'''. The movable element $B^3$ is wound with high-resistance four-phase coils $50^3$, which are connected by leads $69^4$ to the respective mains.

Fig. 14 shows how a three-phase circuit may be connected to the ring-and-bar form of the brush-shifter, constructed as in Fig. 1. The connections are all as in Fig. 10, with the exception of those of the movable element $B^4$, which is here shown as of bar form, like B in Figs. 8 and 9.

Fig. 15 shows how the brush-shifter, constructed as in Figs. 1 and 2, can be connected to a single-phase circuit without employing condensers or inductances. The synchronous motor 30''' here has connected to $69^a$ an independent generator-winding on the armature in quadrature with the regular armature-winding, serving to produce, in conjunction with the motor-current, a four-phase current which excites the rotating field in A, being connected to the latter by leads 69$^a$ in quadrature with the direct leads 69$^b$ from the busbars 67.

It will be seen that the coils of the two elements A and B are invariably connected in parallel with each other, one in current and the other in pressure relation. Now the two fields thus produced have the same frequency. Hence if the poles of the field produced by B are opposite those produced by A they remain opposite at all times, so long as no phase displacement of either current occurs, and hence there will be no rotative effort exerted between the two fields; but if one of the field-currents be now caused to lag or lead over the other the magnetic poles of the corresponding field will be shifted with respect to those of the other through the same angle, and hence there will be now a rotative effort which will turn the movable element B, which is free to rotate through that angle until the poles of the two fields are again opposite each other. This is what happens with the connection given, and, moreover, the phase displacement is always precisely equal to that necessary to restore the brushes to the corresponding neutral position, for the element connected in pressure relation has a magnetic field in consonance with or at least departing by a fixed angle from the impressed electromotive force, which is also the case with the driving-motor, and hence with the velocity of the commutator at all times. The other element, on the contrary, has a magnetic field energized by the rectifier-current and in phase therewith, and thereby is itself necessarily in phase with said current and partakes of all its variations of lag or lead. Now when the load changes this causes the phase of the current to be displaced in one direction or the other, and this is what causes sparking at the commutator, because the brushes are now no longer at the neutral position, which has become shifted forward or backward by an angle equal to the lag or lead. Hence the movable element B will be caused to rotate through such angle, and will thus bring the brushes again to the neutral position. The adjusting mechanism operated by the hand-wheel 66 enables the commutator-brushes 53 to be set properly and accurately once for all in the neutral or sparkless position, and when so set the apparatus will be self-adjusting, as described.

It is to be understood that in practical work ball-bearings and other mechanical adjuncts may be provided to increase the delicacy of movement of the element B, and, moreover, that my invention may be embodied in a great variety of forms, of which the above are only a few examples, and hence I do not limit myself to any special construction so long as the principle of my invention is involved, as set forth in the following claims.

Having thus described my invention, what I claim as new, and desire to secure by Letters Patent, is—

1. In a rectifying apparatus, the combination of a commutator, a set of brushes, a movable element carrying said brushes, and means operated directly by and through the phase displacement of the current for shifting said brushes in accordance therewith.

2. In a rectifying apparatus, the combination of a commutator, a set of brushes, a rotatable brush-holder coaxial therewith, and means operated directly by and through the phase displacement of the current for adjusting said brush-holder.

3. In a rectifying apparatus, the combination of a commutator, a set of brushes, a rotatable brush-holder coaxial therewith, a magnetic element carried by said brush-holder, and a stationary magnetic element, one of said magnetic elements being energized by a current in series and the other by a current in shunt with the current being rectified, whereby said brushes are caused to be adjusted concomitantly with changes in phase of said current.

4. In a rectifying apparatus, the combination of a commutator, a set of brushes, a rotatable brush-holder coaxial therewith, a movable magnetic element operatively connected with said brush-holder, and a stationary magnetic element actuating said movable element, one of said elements being provided with a rotating magnetic field derived from or otherwise dependent on the current being rectified, and the other arranged to shift angularly in accordance with relative changes of phase.

5. In a rectifying apparatus, the combination of a commutator, a set of brushes, a rotatable brush-holder coaxial therewith, a movable magnetic element operatively connected with said brush-holder, and a stationary magnetic element actuating said movable element, said stationary element being provided with a rotating magnetic field derived from or otherwise dependent on the same source from which the current being rectified is taken, and the movable element arranged to shift angularly in accordance with relative changes of phase of the two elements.

6. In a rectifying apparatus, the combination of a commutator, a set of brushes, a rotatable brush-holder coaxial therewith, a movable magnetic element operatively connected with said brush-holder, and a stationary magnetic element actuating said movable element, one of said elements being provided with a rotating magnetic field not dependent on the current being rectified, and the other with a varying magnetic field dependent on the current being rectified.

7. In a current-rectifying apparatus, the combination of a commutator, a set of brushes, a rotatable brush-holder, a rotary magnetic element operating said brush-holder, and a fixed magnetic element coöperating with said movable element, one of said elements having coils connected in series relation and the other having coils connected in parallel relation with the current undergoing rectification.

8. In a current-rectifying apparatus, the combination of a commutator, a set of brushes, a rotatable brush-holder, a rotary magnetic element operating said brush-holder, and a fixed magnetic element coöperating with said movable element, one of said elements carrying a rotary magnetic field and the other a varying magnetic field, and one of said fields being in phase with the current and the other in accordance with the impressed electromotive force of the circuit.

9. In a current-rectifying apparatus, the combination of a commutator, a set of brushes, a rotatable brush-holder, a rotary magnetic element operating said brush-holder, and a fixed magnetic element coöperating with said movable element, said fixed element carrying a rotary magnetic field and said rotary element a varying magnetic field, and one of said fields being in phase with the current and the other in accordance with the impressed electromotive force of the circuit.

10. In a rectifying apparatus, the combination of a commutator, a set of brushes, a rotatable brush-holder coaxial therewith, a magnetic element carried by said brush-holder, a stationary magnetic element, one of said magnetic elements being energized by a current derived from or otherwise dependent on the current being rectified, whereby said brushes are caused to be adjusted concomitantly with changes in said current, and means for independently adjusting the position of said stationary element.

11. In a current-rectifying apparatus, the combination of a commutator, a set of brushes, a rotatable brush-holder, a rotary magnetic element operating said brush-holder, and a fixed magnetic element coöperating with said movable element, one of said elements carrying a rotary magnetic field and the other a varying magnetic field, one of said fields being in phase with the current and the other in accordance with the impressed electromotive force of the circuit, and means for adjusting the position of said fixed element.

12. In a current-rectifying apparatus, the combination of a commutator, a set of brushes therefor, a magnetic member rotatably mounted coaxially with said commutator and carrying said brushes, a stationary ring, surrounding said magnetic member, field-coils adapted to produce a rotary field in said stationary ring and other coils producing a varying field in said magnetic member, one of said sets of coils being connected in current relation and the other in pressure relation with the current to be rectified.

13. In a current-rectifying apparatus, the combination of a commutator, a set of brushes therefor, a magnetic member rotatably mounted coaxially with said commutator and carrying said brushes, a stationary ring surrounding said magnetic member, field-coils adapted to produce a rotary field in said stationary ring, other coils producing a varying field in said magnetic member, one of said sets of coils being connected in current relation and the other in pressure relation with the current to be rectified, a surrounding ring fixed to the frame and in which said stationary ring is rotatably mounted, and adjusting means for shifting the position of said stationary ring.

14. A current-rectifying apparatus comprising a shaft, a rectifying-commutator and a set of slip-rings mounted thereon, connections between the slip-rings and the respective commutator-segments, a synchronous motor driving said shaft by current from the rectifying-circuit, a brush-holder and brushes rotatably mounted adjacent to said commutator, a fixed magnetic ring having a rotary field therein, a magnetic element rotatably mounted adjacent to said ring and having a varying magnetic field therein, one of said magnetic elements being connected in pressure relation and the other in current relation with the rectifying-circuit, and an operative connection between said brush-holder and said rotatable magnetic element.

15. A current-rectifying apparatus comprising a shaft, a rectifying-commutator and a set of slip-rings mounted thereon, connections between the slip-rings and the respective commutator-segments, a magnetic ring carrying a rotary field coaxial with said shaft and adjacent to said commutator, a magnetic member rotatably mounted on said shaft within said ring, commutator-brushes which receive the rectified current and are carried by said magnetic member, and magnetizing-coils on said ring and member, one set being connected in pressure relation and the other in current relation with the rectifying-circuit.

16. In a rectifying apparatus, the combination of a commutator, a set of brushes, a rotatable brush-holder coaxial therewith, a magnetic element carried by said brush-holder, a stationary magnetic element, one of said magnetic elements being energized by a current derived from or otherwise dependent on the current being rectified, whereby said brushes are caused to be adjusted economically with changes in the phase of said current, and means for independently adjusting the position of said stationary element.

In testimony whereof I have hereunto subscribed my hand and affixed my seal this 15th day of August, 1903.

WILLIAM H. FREEDMAN. [L. S.]

Witnesses:
F. R. WHITCOMB,
B. B. BALDWIN.